3,676,268
MACHINE FOR MAKING DOUBLE FACED CORRUGATED PAPERBOARD COMPRISING A PLURALITY OF ROWS OF AXIALLY SPACED, STAGGERED PRESSURE ROLLS
Helmut Brandenburg, Wuppertal, and Hansludwig Beck, Bochum, Germany, assignors to Gebr. Eickoff, Maschinenfabrik und Eisengiessari m.b.H., Bochum, Germany
Filed Oct. 26, 1970, Ser. No. 83,869
Claims priority, application Germany, Nov. 14, 1969, P 19 57 270.4
Int. Cl. B31f 1/20
U.S. Cl. 156—548
8 Claims

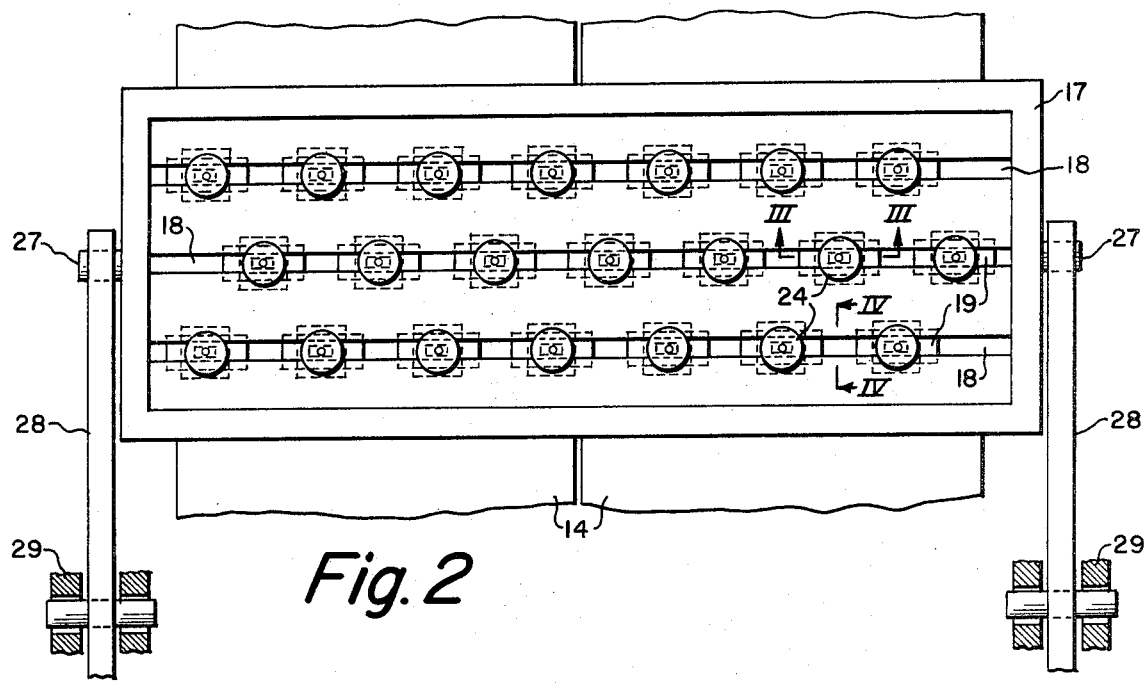
Fig. 2
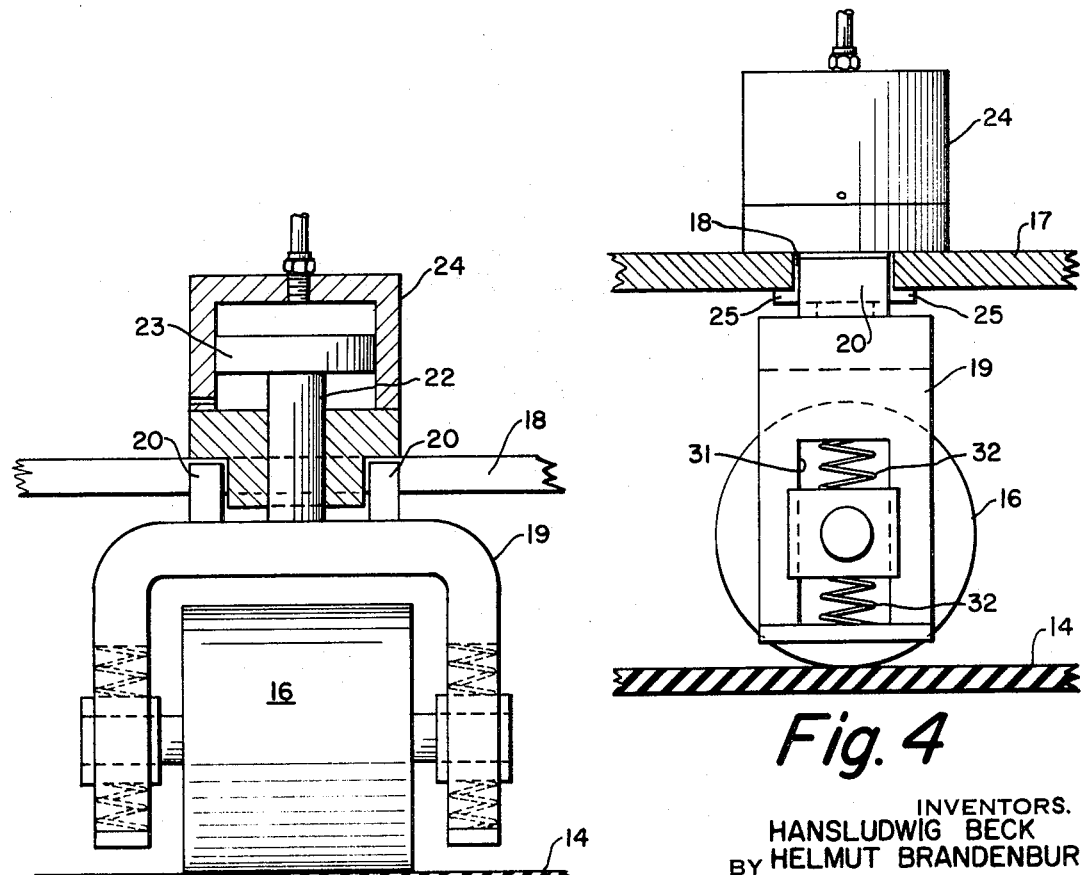
Fig. 3
Fig. 4
INVENTORS.
HANSLUDWIG BECK
BY HELMUT BRANDENBURG
Brown, Murray,
Flick & Peckham
ATTORNEYS United States Patent Office 3,676,268
Patented July 11, 1972

ABSTRACT OF THE DISCLOSURE

Adhesive is applied to the crests of the corrugations of a corrugated paper sheet, to the opposite side of which a flat paper facing sheet has previously been attached. A second facing sheet then is applied to the adhesive-carrying corrugations to form a double faced corrugated paperboard strip. This strip moves across heating plate means, against which it is pressed by an endless traveling weighting belt that has a slack lower strand engaging the upper surface of the paperboard. Weight is added to the belt by means of pressure rolls that rest on its lower strand with their axes extending transversely thereof. The rolls are held in parallel rows spaced lengthwise of the belt, with several rolls in each row. The rolls in each row are spaced apart axially and are staggered relative to the rolls in the rows beside them so as to press the belt against the paperboard evenly in order to promote uniform bonding of the second facing sheet to the corrugated sheet.

---

Figure 1:
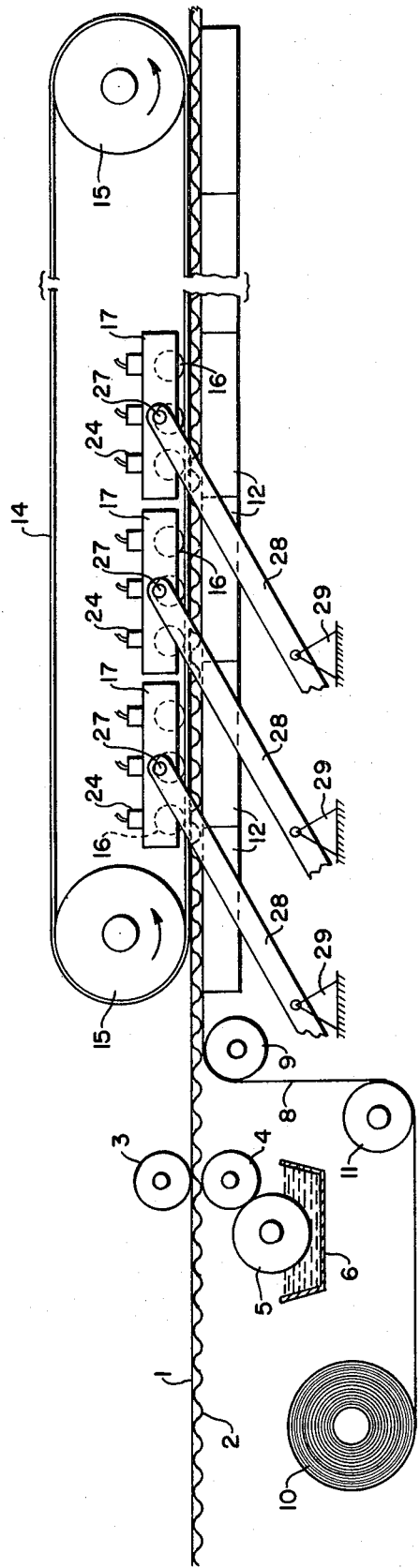

Double faced corrugated paperboard has flat facing sheets glued to both sides of a corrugated sheet. The first facing sheet or lining is applied to one side of the corrugated sheet by any convenient process, but the second facing sheet must be glued to the opposite side of the corrugated sheet while the two facing sheets are maintained in flat planes. Immediately after the second facing sheet has been applied, it is customary to pass the resulting corrugated paperboard over heating plates in order to reduce the time required for bonding the second sheet to the corrugated core and for drying the paperboard. During this process, the paperboard is weighted by an endless travelling belt having a lower slack strand that is supported by the upper facing sheet. In order to increase the pressure of the belt on the strip of paperboard, the belt has been weighted by long rigid pressure rolls. This also increases the friction between the belt and the paperboard so that the latter can be pulled across the heating plates by the belt. The long rolls, however, do not provide a proper distribution of pressure over the width of the strip because they cannot follow its uneven areas caused by uneven application of glue and other factors. Furthermore, it is not possible with such pressure rolls to compensate, for example, for the rapid wear occurring near the edges of the belt, which reduces the thickness of the belt after it has been in use awhile.

It is the object of the present invention to provide a machine for making double faced corrugated paperboard, wherein the pressure provided by the weighting means for the endless belt is so adjustable and so applied that the pressures exerted by different limited areas of the belt against the paperboard can be adjusted individually.

The preferred embodiment of the invention is illustrated in the accompanying drawings, in which
FIG. 1 is a schematic side view;
FIG. 2 is an enlarged plan view of one of the roll units; and
FIGS. 3 and 4 are further enlarged vertical sections taken on the lines III—III and IV—IV, respectively, of FIG. 2.

Referring to FIG. 1 of the drawings, a traveling paper web, which has been formed earlier from a paper facing sheet 1 glued to the top of a corrugated paper sheet 2, passes between upper and lower rollers 3 and 4. The lower roller is an applicator for an adhesive, such as glue, that is applied to it by a dip roller 5 partly immersed in a glue container 6. The glue is applied only to the exposed crests of the corrugations of the corrugated sheet; that is, the low points of the lower surface of that sheet. After the strip leaves the rolls just mentioned, it engages the upper surface of a lower facing sheet 8 that passes over a feed roll 9, to which it is delivered from a supply roll 10 and an intermediate guide roll 11. The lower facing sheet adheres to the corrugated sheet and the resulting double faced corrugated paperboard strip continues forward over a series of heating plates 12 with flat upper surfaces, the purpose of which is to set the glue as rapidly as possible and to dry the sheets so that the lower facing sheet will be securely bonded to the corrugated sheet.

In order to hold the corrugated paperboard strip flat against the heating plates while the glue is setting, there is an endless weighting belt 14 above the plates. This belt extends around rollers 15 journalled near the opposite ends of the series of heating plates. The belt has enough slack in it for its lower strand to press down on the upper facing sheet of the corrugated paperboard strip and thereby reduce the time required for bonding and drying. One of the rollers is driven to move the lower strand of the belt forward, and the frictional engagement of that strand with the paperboard pulls it across the heating plate. However, the weight of the belt alone cannot be depended upon to exert the desired even pressure against the strip, so pressure or weighting rolls rest on the lower belt strand and hold it down firmly against the paperboard.

It is a feature of this invention that the pressure rolls 16 are so arranged that they can apply pressure uniformly over the belt or greater pressure in some areas than in others. Accordingly, as shown in FIG. 2, the rolls are quite short relative to the width of the belt and paperboard and there are several rows of them with several rolls in each row. The axes of the rolls are transverse to the belt and the rows of rolls are spaced lengthwise of the belt. The rolls in each row are spaced apart axially and are staggered relative to the rolls in the rows beside them.

The rolls preferably are arranged in groups, with several rows in each group. Each group of rolls can be held in position by a holding member that may be in the form of a horizontal rectangular frame 17 having a top wall provided with parallel slots 18 extending transversely of the belt. The rolls are inside the frame as shown in FIGS. 3 and 4 and each is rotatably mounted in a yoke 19 that has a pair of lugs 20 projecting up into the overlying slot to prevent the yoke from turning. Extending from the center of each yoke upwardly through the slot is a piston rod 22, on the upper end of which a piston 23 is mounted, as shown in FIG. 3. This piston is disposed in a fluid pressure cylinder 24 that has a reduced lower end portion extending down through the slot and provided in its bottom with lateral flanges 25 (FIG. 4) engaging the lower surface of the top wall of the frame at opposite sides of the slot. The rolls in each row can be moved toward and away from each other by sliding the cylinders along the slot. They can be locked in the desired position by any suitable means.

To hold the several frames in place and yet permit the rolls to weight down the belt, the opposite sides of each frame are provided with trunnions 27 pivoted in the upper ends of a pair of inclined arms 28. Lower down, the arms are pivoted in suitable supports 29 so that their upper ends can swing up and down. The frames therefore can move and be moved vertically and can tilt lengthwise of the belt if necessary. By having rather loose pivoted connections with the arms, the frames also can tilt transversely of the belt.

The pressure rolls and frames add considerable weight to the lower strand of the belt and thereby press it tightly against the underlying paperboard. Since the frames are tiltable, they can tilt or be tilted for proper adjustment relative to the paperboard. They also can be lifted quickly by the arms from the belt if it is necessary to stop the machine suddenly. By adjusting the rolls along the frame slots, pressure can be concentrated where it is needed most. For a narrow web, the rolls in each row can be moved close together, which results in a very smooth surface for the paperboard. Some areas of the paperboard strip may need more pressure than others for proper bonding, and this can be accomplished by admitting pressure fluid to selected cylinders to move the underlying rolls down. Also, as the edges of the belt wear away in thickness, the rolls near those edges can be moved down by fluid pressure to conpensate for the wear, thereby prolonging the life of the belt. It is preferred that the bearings for the rolls be slidable vertically in slots 31 in the yokes, and that coil springs 32 be placed above and below them. These provide a resilient support for the rolls, which may be desirable so that the rolls can yield to any irregularities in the surface of the paperboard strip.

In some cases, costs can be reduced by using the adjustable rolls described herein only in the last third of the heating area relative to the direction of travel of the paperboard. The quality of the product is not lowered because the final bonding of the lower facing sheet to the corrugated sheet takes place in the last third of the heating plate area. For the rest of the heating area conventional pressure rolls may be used that extend over the full width of the belt.

With this invention it is possible to obtain an advantageous pressure distribution over the paperboard during the bonding process, which improves the connection between the lower facing sheet and the corrugated paper core. It also is possible to compensate for areas of different thickness of the belt and for unevenness of the paperboard strip by a selective adjustment of the contact pressure of the rolls. In addition, the surface of the corrugated paperboard is improved as the facing sheet is firmly glued to the corrugated sheet and formation of blisters is prevented. This permits the lower facing sheet to be used as the outside of the finished cellular board. Furthermore, because of the even surface pressure, the heat transfer from the heating plates to the paper is very high and this facilitates the working of heavy paper and makes a high operating speed of the machine possible.

We claim:

1. In a machine for making double faced corrugated paperboard from a forwardly moving single faced web preformed from a paper facing sheet secured to one side of a corrugated paper sheet, wherein there are means for applying adhesive to the exposed crests of the corrugations of the corrugated sheet, means for then applying a paper facing sheet to said crests to form the double faced corrugated paperboard, heating plate means for supporting and heating the forwardly moving paperboard, and an endless traveling weighting belt disposed above said plate means and having a slack lower strand for engaging the upper surface of the paperboard; the improvement that comprises weighting rolls resting on said lower strand with their axes transverse to it, and means holding the rolls in parallel rows spaced lengthwise of the belt with several rolls in each row, the rolls in each row being spaced apart axially and staggered relative to the rolls in the rows beside them to press the belt against the paperboard evenly, whereby to promote uniform bonding of said last-mentioned facing sheet to said crests of the corrugated sheet.

2. In a machine as defined in claim 1, in which said roll-holding means include a plurality of holding members disposed along the belt with each one holding a plurality of said rows of rolls, and means supporting said members in position but allowing them to move vertically relative to one another.

3. In a machine as defined in claim 2, in which said supporting means include arms pivoted on horizontal axes to the opposite sides of said roll-holding members, and means pivotally supporting the arms for tilting.

4. In a machine as defined in claim 2, in which each of said roll-holding members is a horizontal rectangular frame having a top wall provided with parallel slots extending transversely of the belt, there being a plurality of yokes in the frame extending into each slot, said rolls being mounted in the yokes, and the yokes being adjustable along the slots.

5. In a machine as defined in claim 4, including a piston rod extending from each yoke up through the overlying frame slot, a piston on the upper end of the rod, a fluid pressure cylinder containing the piston, and means holding the cylinder down on the frame, whereby fluid pressure in the cylinder above the piston will move the underlying yoke dawnward.

6. In a machine as defined in claim 1, in which said roll-holding means include yokes in which the rolls are journalled, the rolls being movable vertically in the yokes and resiliently supported therein.

7. In a machine as defined in claim 1, in which said roll-holding means include a plurality of holding members disposed along the belt with each one holding a plurality of said rows of rolls, and fluid pressure means supported by said holding members for selectively pressing different rolls downwardly relative to the rest of the rolls.

8. In a machine as defined in claim 1, said staggered rolls being disposed above the last third of the area of said heating plate means relative to the direction of movement of said lower strand of the belt.

References Cited

UNITED STATES PATENTS

| | | | |
|---|---|---|---|
| 1,858,375 | 5/1932 | Schroeder | 156—473 |
| 3,063,362 | 11/1962 | Guettler | 100—154 |
| 3,282,764 | 11/1966 | Goettsch | 156—548 X |
| 3,472,158 | 10/1969 | Shields | 156—60 X |

ROBERT F. BURNETT, Primary Examiner

D. J. FRITSCH, Assistant Examiner

U.S. Cl. X.R.

100—154; 156—206, 210, 292, 470, 553